United States Patent Office 3,019,247
Patented Jan. 30, 1962

3,019,247
NEW ORGANOTIN DERIVATIVES
Gerry P. Mack, Jackson Heights, and Emery Parker, New York, N.Y., assignors to Carlisle Chemical Works, Inc., Reading, Ohio
No Drawing. Filed Jan. 29, 1957, Ser. No. 636,856
2 Claims. (Cl. 260—429.7)

The invention relates to new organotin derivatives, and this application is a continuation-in-part of our copending application Serial No. 448,760, filed August 9, 1954, and issued as U.S. Patent No. 2,938,013 on May 24, 1960.

The novel compounds comprise reaction products of a partial ester of a dicarboxylic or polycarboxylic acid, which contain one free carboxyl group and at least one free alcoholic hydroxyl group, with an organotin compound selected from the group consisting of monomeric or polymeric organotin hydroxides, oxides, and alkoxides. In said compounds, said ester is bound through the oxygen of the carboxyl group to the tin atom of the organo-tin compound and the free hydroxyl group of the ester component imparts to the compounds particularly valuable properties for the use as stabilizers for halogen-containing resins.

The compounds may be broadly defined by the general formula (1)    $R^1R^2XSnZ$ wherein $R^1$ and $R^2$ represent different or preferably the same aliphatic, alicyclic, or aromatic hydrocarbon radicals; Z is the radical of an ester of a polycarboxylic acid in which all but one of the carboxyl groups are esterified by a dihydric or polyhydric alcohol. In the simplest case, Z is the radical of a half ester of a dicarboxylic acid of the formula (2)    $OOCR^5COOY$ wherein $R^5$ is a saturated or unsaturated divalent hydrocarbon radical and Y the residue of a dihydric or polyhydric alcohol containing at least one free hydroxyl group. X is a member of the group consisting of $R^3$, $OR^4$, Z and $(R^1R^2SnO)_{x-1}Z$, wherein the last recited group is characteristic for polymeric compounds of the type involved. $R^3$ designates the same type of hydrocarbon radical as represented by $R^1$ and $R^2$; if X is $R^3$, the compounds are esters of trihydrocarbontin hydroxides; $OR^4$ is an alkoxy radical derived from aliphatic, alicyclic, or aromatic alcohols, and the compounds containing $OR^4$ are ether esters of hydrocarbon substituted stannanediols, whereas in the case of X=Z the compounds are diesters of such stannanediols. If X is the group $(R^1R^2SnO)_{x-1}Z$, the compounds are esters of linear hydrocarbon substituted polystannanediols, where x designates the degree of polymerization.

The ester used for introducing the group Z may be composed of any combination of a di- and polycarboxylic acid with a glycol or polyol. Suitable acids are, for instance, adipic acid, sebacic acid, fumaric acid, maleic acid, succinic acid, malonic acid, glutaric acid, itaconic acid, aconitic acid, citraconic acid, citric acid, tartaric acid, and the like. As examples of suitable glycols and polyhydric alcohols, we may list: ethylene glycol, diethylene glycol, polyethylene glycol, the corresponding propylene glycols, glycerol, trimethylol methane, trimethylol propane, pentaerythritol, sorbitol and other sugar alcohols, and the like.

The new compounds are prepared by reacting an ester as defined hereinabove with an organotin axide, hydroxide or alkoxide; suitable organic groups of the organotin radical are, for instance, methyl, ethyl, propyl, butyl, amyl, hexyl, octyl, lauryl, allyl, benzyl, phenyl, tolyl, furfuryl, cyclohexyl, naphthyl, and others. If the reaction is carried out with an organotin alkoxide, we prefer to use such an alkoxide which is derived from a lower alcohol, preferably a methoxide. If a monomeric dihydrocarbon tin dialkoxide is reacted with only one mole of the ester, the corresponding ether ester is obtained, i.e. a compound of the Formula 1, wherein X is alkoxide; with two moles of the ester, the diester is obtained—that is X=Z. In the case of polymeric dihydrocarbon tin dialkoxides, polystannanediol derivatives of the formulae (3) 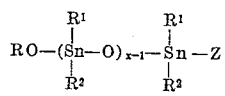

and (4) 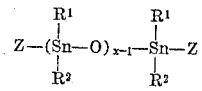

respectively, are obtained.

The compounds of the invention are mostly liquids when in the monomeric state; the higher polymers are colorless solids.

Like other organotin esters and ether esters, the new compounds are excellent stabilizers to protect halogen-containing resins against deterioration and discoloration due to the influence of heat and light. They are superior to said known esters and ether esters because the free hydroxyl groups of the ester component increases the compatibility of the new compounds with said resins and the plasticizers used therein.

Due to the highly polar nature of the novel ester compounds, their compatibility with resins and plasticizers is greatly enhanced; if decomposition should take place during heat processing, the decomposition products remain compatible with the resin and do not have the tendency of sweating out. Their properties are of particular importance in the preparation of optically clear rigid vinyl sheeting, where no polar plasticizers are present and incompatible ingredients would produce haziness and clouding.

The most unexpected and valuable property of the new compounds, when compared with the corresponding organotin esters not containing free hydroxyl groups, is their insolubility or very much reduced solubility in fats. This property makes the new compounds excellent stabilizers in wrappings and containers made of halogen-containing plastics whenever such containers are to be used for fats and fat containing foods.

The invention is further illustrated by the following examples, in which the amounts are given in parts by weight.

*Example 1*

348 parts of propylene glycol maleate half ester were added to a slurry of 250 parts of dibutyltin oxide in 300 cc. of toluene. The solvent and the water of reaction were removed by heating the batch in vacuo at 90 to 95° C.

The liquid product obtained in almost theoretical yield was dibutyltin di(propyleneglycol maleate) of the formula

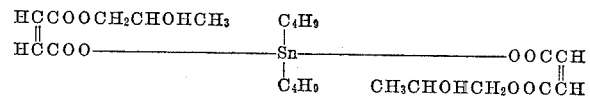

having the following characteristics

Ref. ind. at 20° C.: 1.5060

Sp. gr. at 20° C.: 1.374

Sn found 19.5% (theory: 20.5%)

It is possible that the compond is a mixture of the two isomeric configurations of the maleic ester group

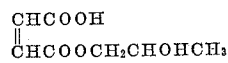

or

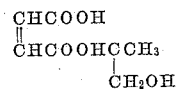

In the same manner, the dibutyltin di(propylene glycol fumarate) was prepared.

*Example 2*

408.4 parts of glyceryl itaconate were added to 192.8 parts of diethyltin oxide dispersed in warm toluene, and the batch was heated until 36 parts of water had distilled out as an azeotrope. Subsequently, the toluene was removed under reduced pressure.

The remaining compound had the formula

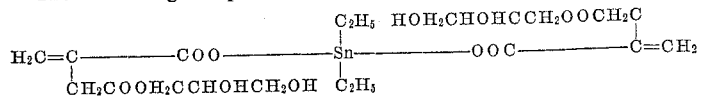

*Example 3*

61.4 parts of tributyltin hydroxide were slowly added with stirring to 56 parts of di(ethyleneglycol) citrate in anhydrous isopropyl alcohol. After a complete solution was obtained, vacuum was applied and the water of reaction was removed together with the solvent. The obtained compound had the formula

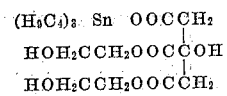

Sn found 21.0% (theory 21.4%).

*Example 4*

Polymeric dibutyltin dimethoxide was prepared according to Example 1 of Patent No. 2,626,953, by gradually adding at a temperature of 0° C. sodium methoxide to dibutyl tin chloride dissolved in toluene. After short heating to 80° C., the reaction product was filtered hot from the precipitated sodium chloride and the toluene was distilled off.

150 parts of the thus obtained polymeric dibutyltin dimethoxide having a polymerization degree of 1.3 were dissolved in toluene, and 180 parts of dipropylene glycol maleate half-ester were added to the solution. The methanol split off during the reaction was distilled out under reduced pressure, together with the toluene. The product thus obtained had the formula

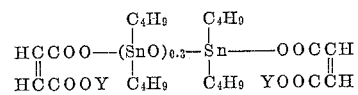

wherein

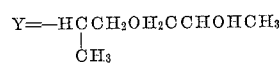

What we claim is:

1. As a new chemical compound, dialkyl tin di(alkyleneglycol maleate) of the formula

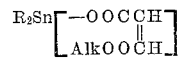

wherein R is alkyl and Alk is the radical of a glycol selected from the group consisting of monoethyleneglycol, diethyleneglycol, monopropyleneglycol and dipropyleneglycol and containing one free alcoholic hydroxyl group.

2. As a new compound, dibutyltin di(propyleneglycol maleate) of the formula

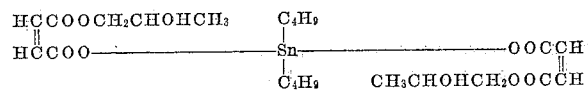

References Cited in the file of this patent

UNITED STATES PATENTS

| | | |
|---|---|---|
| 1,917,249 | Harris | July 11, 1933 |
| 2,631,990 | Mack et al. | Mar. 17, 1953 |
| 2,715,111 | Weinberg | Aug. 9, 1955 |
| 2,796,412 | Weinberg | June 18, 1957 |
| 2,832,752 | Weinberg et al. | Apr. 29, 1958 |

UNITED STATES PATENT OFFICE
CERTIFICATE OF CORRECTION

Patent No. 3,019,247                                      January 30, 1962

Gerry P. Mack et al.

It is hereby certified that error appears in the above numbered patent requiring correction and that the said Letters Patent should read as corrected below.

Column 4, lines 26 to 29, the formula should appear as shown below instead of as in the patent:

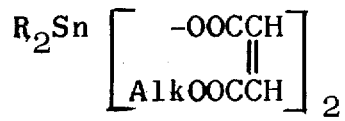

Signed and sealed this 15th day of October 1963.

(SEAL)
Attest:

ERNEST W. SWIDER                                    EDWIN L. REYNOLDS

Attesting Officer                                        Acting Commissioner of Patents